United States Patent
Giordan et al.

(10) Patent No.: US 10,519,801 B2
(45) Date of Patent: Dec. 31, 2019

(54) INSTRUMENTED FLOW PASSAGE OF A TURBINE ENGINE

(71) Applicant: Safran Aircraft Engines, Paris (FR)

(72) Inventors: Jérémy Giordan, Moissy-Cramayel (FR); Valentine Lucette Bader, Moissy Cramayel (FR); André Pierre Jean Xavier Leroux, Moissy Cramayel (FR); Stéphane Rousselin, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 407 days.

(21) Appl. No.: 15/363,684

(22) Filed: Nov. 29, 2016

(65) Prior Publication Data

US 2017/0152757 A1 Jun. 1, 2017

(30) Foreign Application Priority Data

Nov. 30, 2015 (FR) .................... 15 61586

(51) Int. Cl.
| | |
|---|---|
| *F01D 21/00* | (2006.01) |
| *G01M 9/06* | (2006.01) |
| *F01D 9/02* | (2006.01) |
| *G01H 13/00* | (2006.01) |
| *F01D 9/06* | (2006.01) |
| *F01D 17/08* | (2006.01) |
| *F16F 15/027* | (2006.01) |

(52) U.S. Cl.
CPC .............. *F01D 21/003* (2013.01); *F01D 9/02* (2013.01); *F01D 9/065* (2013.01); *F01D 17/08* (2013.01); *G01H 13/00* (2013.01); *G01M 9/065* (2013.01); *F05D 2220/30* (2013.01); *F05D 2270/334* (2013.01); *F16F 15/0275* (2013.01); *Y02T 50/671* (2013.01)

(58) Field of Classification Search
CPC ........ F01D 21/003; F01D 17/00; F01D 17/02; G01H 13/00
USPC ....................... 377/144; 73/112.01
See application file for complete search history.

(56) References Cited

U.S. PATENT DOCUMENTS

| | | | | |
|---|---|---|---|---|
| 3,348,414 A | * | 10/1967 | Waters .................. | F01D 17/085 374/115 |
| 3,545,571 A | * | 12/1970 | Kirkpatrick ............. | F01D 17/08 184/6.11 |
| 4,433,584 A | * | 2/1984 | Kokoszka ............... | G01P 5/175 73/861.66 |
| 4,733,975 A | * | 3/1988 | Komanetsky .......... | G01K 13/02 244/53 R |

(Continued)

FOREIGN PATENT DOCUMENTS

| | | |
|---|---|---|
| FR | 952713 | 9/1947 |
| GB | 2 452 026 A | 2/2009 |
| KR | 2013-021966 A | 3/2013 |

*Primary Examiner* — Kenneth Bomberg
*Assistant Examiner* — Hakeem M Abdellaoui
(74) *Attorney, Agent, or Firm* — Blank Rome LLP

(57) ABSTRACT

An annular air flow passage, particularly for a turbine engine, comprising two radially internal and external annular walls. A measuring element is elongated in a direction between the internal and external annular walls, and a first of the internal or external ends of the element is fixed rigidly to a first of the internal or external walls. The element includes at least one tubular cavity extending along the element and supplied with pressurized fluid.

9 Claims, 3 Drawing Sheets

(56) References Cited

U.S. PATENT DOCUMENTS

| | | | |
|---|---|---|---|
| 5,005,353 A | 4/1991 | Acton et al. | |
| 10,138,754 B2* | 11/2018 | Giordan | F01D 17/20 |
| 10,151,214 B2* | 12/2018 | Rice | F01D 17/08 |
| 2009/0122833 A1 | 5/2009 | Davda | |
| 2013/0167554 A1* | 7/2013 | Parsons | G01K 1/12 |
| | | | 60/803 |
| 2015/0044017 A1* | 2/2015 | Smith | F01D 9/02 |
| | | | 415/1 |
| 2016/0160658 A1* | 6/2016 | McCaffrey | F01D 5/282 |
| | | | 415/200 |
| 2017/0138216 A1* | 5/2017 | Giordan | G01P 5/14 |
| 2018/0340444 A1* | 11/2018 | Jausovec | F01D 9/041 |
| 2018/0348255 A1* | 12/2018 | Manzano | F01D 17/02 |

* cited by examiner

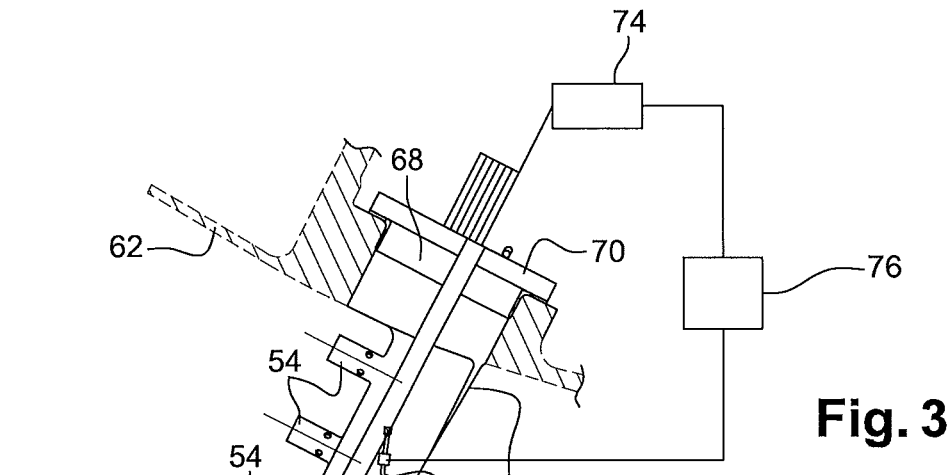
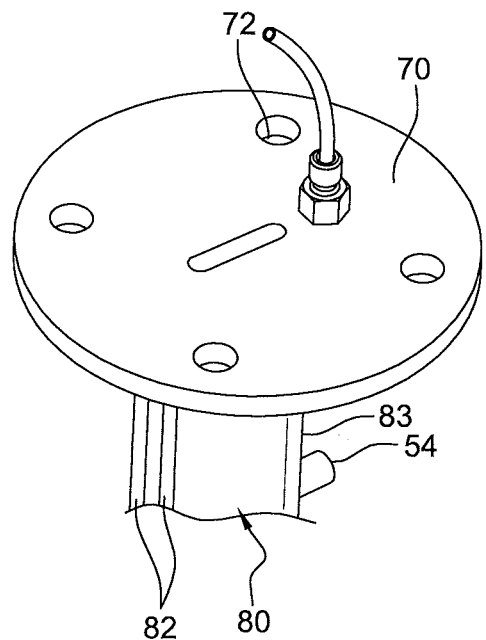
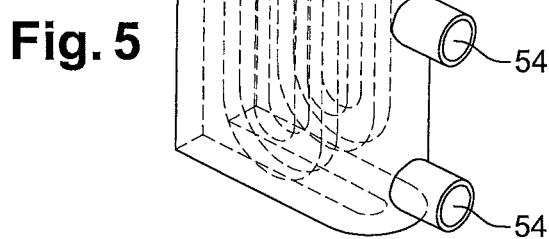

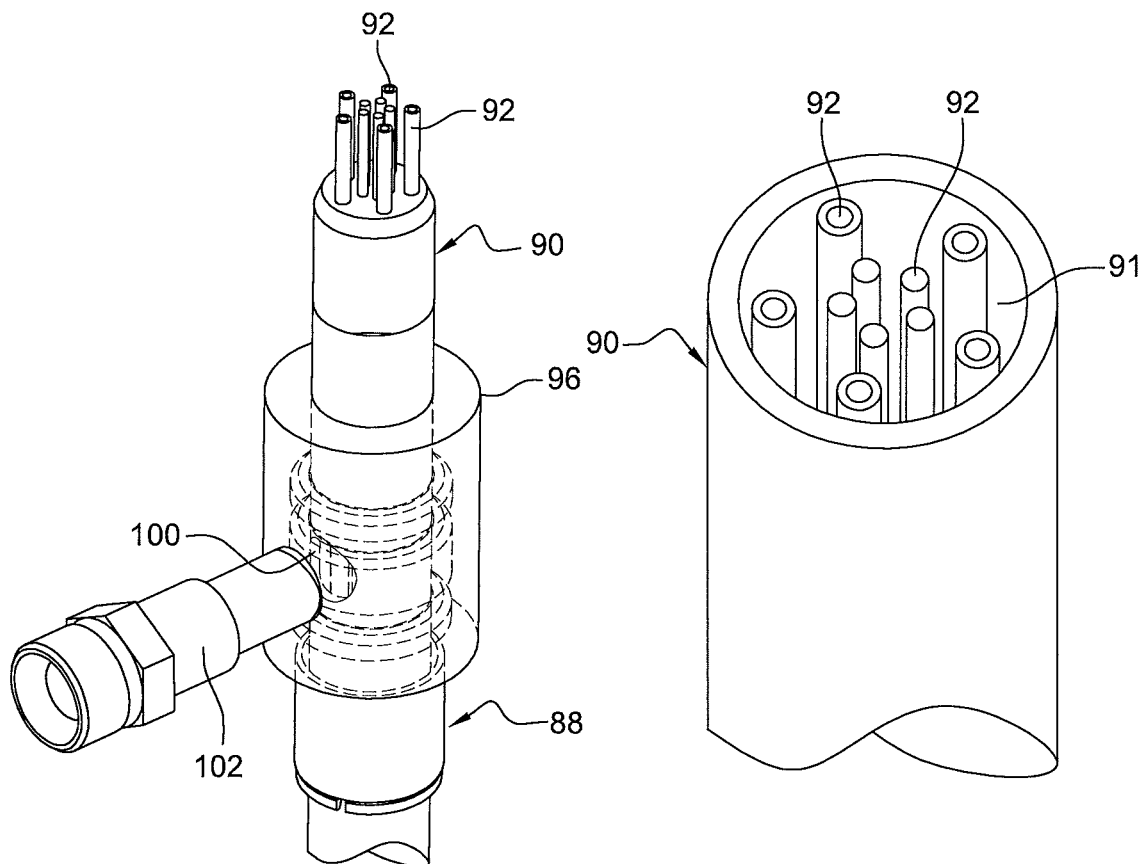
Fig. 6
Fig. 7
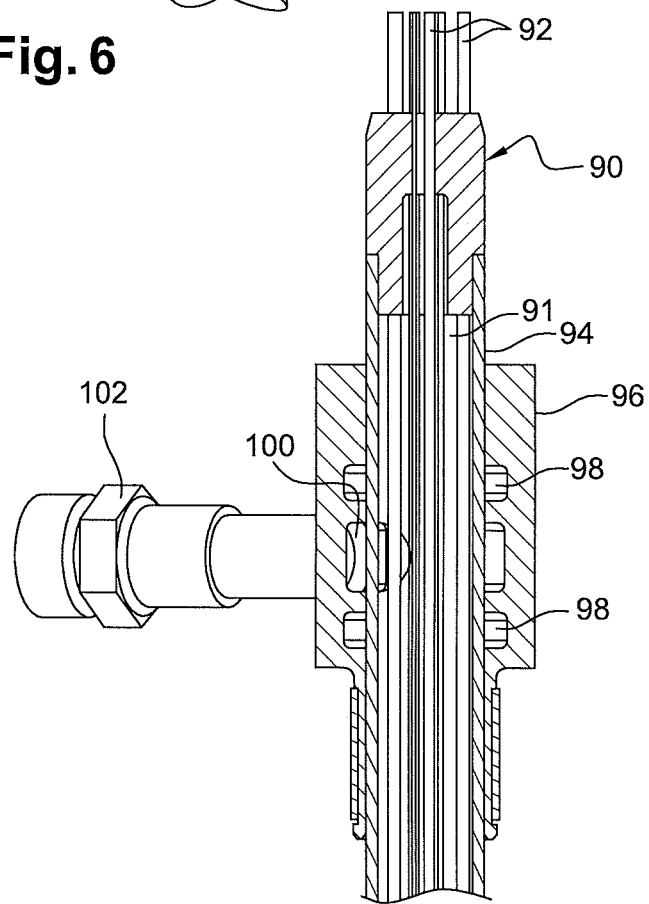
Fig. 8

INSTRUMENTED FLOW PASSAGE OF A TURBINE ENGINE

BACKGROUND OF THE INVENTION

1. Field of the Invention

The present invention concerns an annular air flow passage, particularly for a turbine engine, such as a turbofan or turboprop, comprising an elongated element passing through the flow passage and capable of being instrumented.

2. Description of the Related Art

Conventionally, a dual-flow turbofan 10, as illustrated in FIG. 1, consists of a gas turbine 12 with a revolution axis 14 driving a ducted fan wheel 16, wherein the latter is generally positioned upstream from the turbofan. The mass of air sucked in by the engine is divided into a primary air flow (arrow A) that flows through the gas turbine 12 or engine core and a secondary air flow (arrow B) originating from the fan 16 and surrounding the engine core, wherein the primary and secondary air flows are concentric and circulate in a primary annular flow passage 18 and a secondary annular flow passage 20 respectively 8.

In a manner well known per se, the primary air flow (arrow A) is generally compressed by a low-pressure compressor 22 and subsequently by a high-pressure compressor 24, each having vanes both fixed 26 and mobile arranged alternatively in the direction of movement of the flow. The low-pressure compressor shaft is connected to the fan wheel 4 and is driven in rotation by the shaft of a low-pressure turbine arranged downstream (not illustrated). The low-pressure compressor shaft is driven in rotation by the shaft of a high-pressure turbine arranged at the outlet of a combustion chamber and located upstream from the low-pressure turbine (both not illustrated).

In a double-body turbofan of this kind, fan casing usually designates the external annular wall 28 surrounding the fan wheel 16 and intermediate casing 30 designates a structural element of the turbine engine interposed axially between the compressors, low-pressure 22 and high-pressure 24, which passes through the annular flow passages, primary 18 and secondary 20. This intermediate casing 30 comprises two annular walls, radially internal 32 and external 34, respectively delimiting, internally and externally, the primary annular air flow passage 18 and two annular walls, radially internal 36 and external 38 delimiting internally and externally the secondary annular flow passage 20, respectively.

Within the context of developing a turbofan, the latter's performances need to be tested with a view to its certification. Development turbine engines are therefore provided for this purpose. A large number of measurements are performed on these turbofans. The characteristics of the aerodynamic flow in particular are measured at specific axial positions or measurement planes 40a, 40b, 40c.

For this purpose, measuring elements 42a, 42b, 42c, commonly known as measurement sensors, arranged on the measurement planes 40a, 40b, 40c, are generally used to characterise the aerodynamic flow by measuring parameters such as pressure and temperature for example during operation. Such an element, 42a, 42b, 42c, comprises a first radially external end 44 and a second end 46, radially internal in relation to the axis of rotation. As shown in FIG. 2, the first end 44 of the element 42a comprises a base 48 fixed by bolting to the fan casing 28. The base 48 is thus fixed rigidly in all directions to the wall 28.

The element may extend appreciably in a radial direction like elements 42a or 42b, which are arranged in the secondary air flow and are rigidly fixed by their radially external end or like element 42c, which extends appreciably perpendicularly from the internal wall 32 internally delimiting the primary air flow passage.

The second end 46 of the element opposite the first end 44 fixed to the turbine engine is generally free, i.e. with degrees of freedom in the axial, radial and circumferential directions.

These elements 42a, 42b, 42c, are termed intrusive, since immersed in the primary or secondary air flow. The measuring element 42a comprises a tubular body 50 with an external aerodynamic shape liable to affect as little as possible passage of a flow of air. The body 50 comprises an upstream surface 52 provided with holes distributed along the direction of elongation of the body 50. In the embodiment shown in FIG. 2, a cylindrical nozzle 54 is installed in each hole so as to protrude in the upstream direction in relation to the upstream surface 52. Each nozzle 54 is equipped with means of measurement of characteristics of a flow, such as temperature or pressure for example.

Owing to their intrusive nature in the aerodynamic flow passages of the engine, a study of the vibration behaviour of the instrumented elements is performed systematically during the design phase. It is therefore important to limit resonance phenomena of the element liable to cause cracks in the measuring element capable of affecting its mechanical integrity. In extreme cases, formation of nicks or cracks as a result of the vibrations may cause partial or total dislocation of the element 42a, 42b, 42c. The debris thus released circulates in the flow passage and may damage components of the turbine engine arranged downstream. It is clear that the damage caused by such dislocation may be particularly severe when a measuring element 42a, 42b, 42c is installed in the primary flow passage, since the debris pay damage the combustion chamber and the fixed and rotating components of the high-pressure and low-pressure turbines.

This resonance phenomenon of the element may be due to several sources of vibratory stimuli within the turbine engine. A first source of vibration results for example from the residual imbalance of the rotating assemblies, i.e. of the low-pressure and high-pressure rotors. A second source of vibration originates from the alternation of the compression and decompression phases due to rotation of a row of mobile blades. This second source of vibration proves particularly intense when the measuring element is arranged immediately downstream from an impeller as is the case with the element 42a in FIG. 1.

By way of an example, a fan wheel, comprising 30 blades, revolving at a rotation speed of 2000 rpm, generates a pulsation of air in an axial direction of around 1000 Hz. If the first normal mode of the measuring element is close to 1000 Hz, the element will have a high risk of resonating in this case.

A measuring element has natural frequencies that are fixed and depend on its structural and dimensional characteristics. When the vibration frequency of the element $f_1$ comes close to its resonance frequency $fr_1$ of rank 1 or its harmonic natural frequencies, there is a high risk of resonance of the measuring element, which increases the risk of crack formation.

For purpose of clarity, we will take as an example of natural frequency the resonance frequency $fr_1$ of rank 1.

In order to minimize resonance phenomena, the engine operating ranges should be limited in this case to ranges in which the vibration frequency $f_1$ is sufficiently distanced from the resonance frequency $fr_1$. In other words, some ranges of operating speeds of the turbofan may be prohibited in the presence of the measuring element, thereby reducing the value of the engine trials. Stoppage of the test turbine engine may therefore be necessary in order to change the element, which results in an increase in costs.

SUMMARY OF THE INVENTION

The invention more particularly aims at providing a simple, efficient and cost-effective solution to the problems of the prior art disclosed above.

To this end, it proposes an annular air flow passage, particularly for a turbine engine, comprising two radially internal and external annular walls, wherein a measuring element is elongated in a direction between the internal and external annular walls and a first of the internal or external ends of the element is fixed rigidly to a first of the internal or external walls, characterised in that said element comprises at least one tubular cavity extending along the element and supplied with pressurized fluid.

Hence, when the measuring element comprising means of instrumentation is subjected to vibrations close to its resonance frequency, it is possible, via the supply with pressurized fluid, to vary the stiffness K of the element by varying the fluid pressure inside the tubular cavity of the element. Changing the stiffness K (N·m$^{-1}$) of the element causes a change in the natural frequency of the measuring element, which allows distancing of its vibration frequency from its resonance frequency during operation.

According to another characteristic of the invention, said at least one cavity is a closed circuit of pressurized fluid. In this configuration, the cavity only has fluid communication with means of supply of fluid.

The pressurized fluid is advantageously air, thereby avoiding an increase in the mass of the element, wherein said increase in mass may be virtually ignored with regard to the variation in the stiffness caused by the variation in pressure. Furthermore, a gas such as air offers the advantage of having a density less than that of liquids, for the same pressure. The increase in stiffness caused by an increase in the pressure of said at least one cavity of the element is not nullified by an increase in the total mass of the element (refer to equation 1 below).

Indeed, given its elongation in one direction, this element may at first sight be likened to a beam, one of the ends of which is embedded and the other end of which is free. Consequently, the Euler-Bernoulli beam theory may be applied, which stipulates that the natural frequencies $fr_i$ of the element adopt the form:

$$fr_i = \frac{\alpha_i^2}{2\pi L^2} \sqrt{\frac{K}{M}} \quad (1)$$

where $\alpha_i$, expressed in metres, is a coefficient that depends on the mode order and the conditions of anchoring the element on the casing, whereby i is a natural number denoting the number of the normal mode considered for the calculation;

L, expressed in metres, is the length of the element from its radially external end to its radially internal free end;

K, expressed in Newtons per metre, is the rigidity of the element; and m, expressed in kg, is the mass of the element.

It can be readily deduced from this relationship that varying the stiffness causes a change in the natural frequencies of the element.

In a first embodiment, the measuring element has, in a plane perpendicular to its direction of elongation, a U shape formed of two branches. Furthermore, among said at least one tubular cavity, at least one cavity is arranged in each of the branches.

In this embodiment, the housing formed by the branches of the U allow passage of the measuring cables connected to the means of measurement of the characteristics of a flow housed in nozzles along the measuring element.

The cavities formed in the branches of the U are supplied with pressurized fluid, thereby making it possible to vary if necessary the stiffness of each of the branches.

In another embodiment of the invention, the measuring element comprises a tubular body delimiting said at least one cavity, wherein this cavity extends along said direction of elongation and houses a plurality of cables connected to nozzles for measuring the characteristics of the air flow in the flow passage, wherein these nozzles are oriented in an upstream direction.

Hence, in this embodiment, the cables for connection to the measuring nozzles are arranged in the cavity connected to the means of pressurization.

According to another characteristic of the invention, a section of the tubular body is surrounded by a sealing ring through which the cavity is supplied with pressurized fluid.

In a practical embodiment of the invention, the measuring element is elongated in the flow passage in a substantially radial direction, wherein the first end of the measuring element can be fixed rigidly to the external wall and a second end of the measuring element opposite said first end can be free, i.e. with degrees of freedom in the axial, radial and circumferential directions.

Control of the natural frequencies of the element is particularly important when the second end is completely free. Indeed, in this configuration, the element is highly sensitive to the vibrations during operation.

It should be noted that the invention would also be applicable if the second end were only to have a single degree of freedom at the second end.

Preferentially, the flow passage comprises means of supply with pressurized fluid and means of control of the means of supply with pressurized fluid. Preferably, the means of control are connected on entry to means of measurement of the frequency of vibration of the element.

The means of control make it possible to send a setpoint pressure value to the means of supply, wherein said means of supply are configured to be able to adapt the pressurized fluid supply to the setpoint value.

The invention also concerns a turbine engine comprising a flow passage as described above and an annular row of mobile blades driven in rotation by a rotor, wherein said measuring element is arranged in said flow passage downstream from said annular row of blades.

In this configuration, during operation, the blades effect, through their rotations, a series of pulses, alternating compression and decompression, with the frequency of this series of pulses at the frequency f influencing the vibration frequency of the element $f_1$, which may then approximate the natural frequency $fr_1$ of the element, whereby the shift in the centre of gravity thus advantageously allows modification of the resonance frequency $fr_1$ of the element.

The invention furthermore concerns a method for varying the stiffness of the measuring element of an annular flow passage in a turbine engine comprising the steps involving:

a) identifying the pressure in said at least one tubular cavity of the measuring element;

b) measuring the vibration frequency $f_1$ of said element;

c) determining the natural frequency $fr_1$ of the measuring element based on the pressure identified in the cavity and obtaining the absolute value $|f_1-fr_1|$;

d) comparing the absolute value $|f_1-fr_1|$ with a threshold and establishing a risk of resonance if this absolute value is less than or equal to the threshold in this case; and e) if a risk of resonance has been established at the preceding step, varying the pressure in said at least one tubular cavity of the measuring element until the risk is no longer established.

The method according to the invention allows, using means of modification of the pressure in a cavity of the measuring element, modification of the natural frequency $fr_1$ of the element such that this frequency is sufficiently distanced from the vibration frequency $f_1$ depending on the element. It is thus possible to limit the risks of resonance of the element.

When there is insufficient difference between the frequencies $f_1$ and $fr_1$, two situations arise: the first, if $f_1 > fr_1$ implies a situation in which the vibration frequency $f_1$ of the element is greater than its first natural frequency $fr_1$, the second if $f_1 < fr_1$ implies a situation in which the vibration frequency $f_1$ of the element is greater than its natural frequency $fr_1$. Consequently, $fr_1$ needs to be moved apart from $f_1$, avoiding equality between these two values. This is achieved through a reduction in $fr_1$ when $f_1$ is higher and an increase in $fr_1$ when $f_1$ is lower.

Such a method makes it possible to control the natural frequencies $f_{r_1}$ of the element taking account of the vibration frequency $f_1$ of the element during operation. In practice, the natural frequency calculated will correspond to the first natural resonance frequency of the measuring element.

The threshold is preferably a value included between 5% and 10% of the value of the natural resonance frequency $fr_1$.

BRIEF DESCRIPTION OF THE DRAWINGS

The invention will be better understood, and other details, characteristics and advantages of the invention will appear upon reading the following description given by way of a non restrictive example while referring to the appended drawings wherein:

FIG. 3 is a diagrammatic view of a measuring element according to the invention;

FIG. 4 is a perspective diagrammatic view of connection of the means of pressurized air supply to an element according to a first practical embodiment of the invention;

FIG. 5 is a perspective sectional diagrammatic view of the element in FIG. 4;

FIG. 6 is a perspective diagrammatic view of a second practical embodiment of an element according to the invention;

FIG. 7 is a perspective cross-sectional view of the element in FIG. 6;

FIG. 8 is a diagrammatic view along a longitudinal cross-section of the element in FIG. 6.

DETAILED DESCRIPTION OF THE PREFERRED EMBODIMENTS

Figure 1:
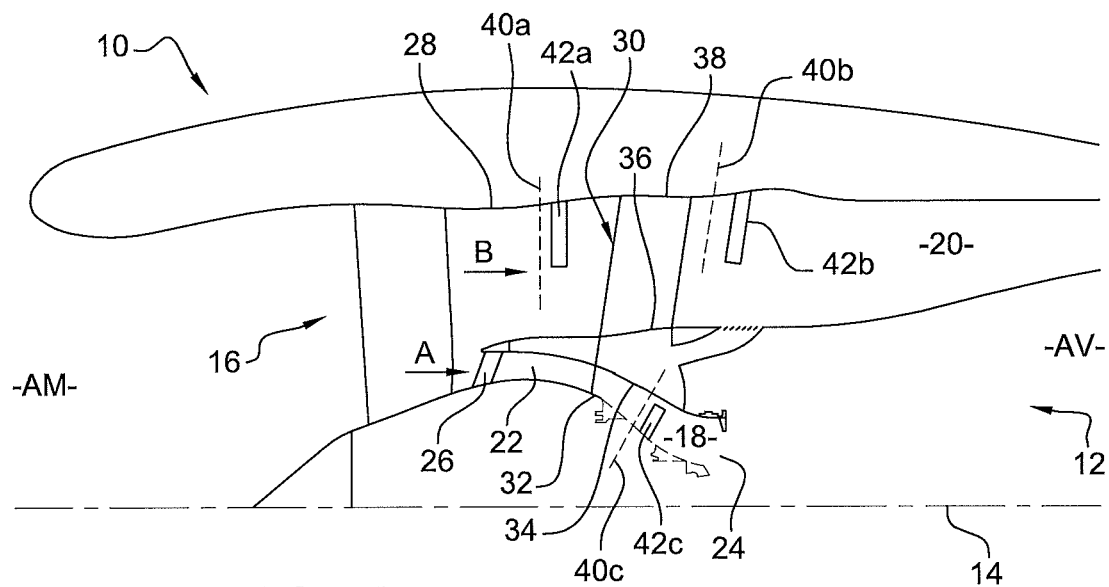
FIG. 1 already described is a cross-sectional axial diagrammatic half-view of an aircraft turbofan of a known type.
Figure 2:
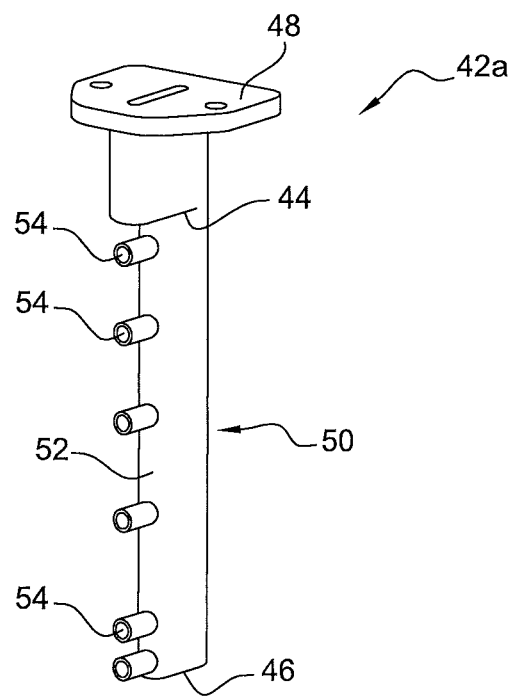
FIG. 2 already described is a perspective diagrammatic view of an element for measuring characteristics of a flow according to the known technology.

FIG. 3 represents a portion of a turbine engine annular flow passage such as an annular secondary air flow passage, comprising a measurement device 56 for measuring characteristics of the air flow featuring a measuring element 58 extending in the air flow between internal 60 and external 62 revolution walls delimiting the air flow.

The measuring element 58 comprises a first radially external end 64 and a second end 66, radially internal. The radially external end is connected to a cylindrical portion 68 interdependent with a disc-shaped base 70 perforated by four holes 72 (FIGS. 3 and 6). The measuring element 58 is inserted radially from outside the radially external wall 62 into an opening in the latter such that the cylindrical portion 68 and the disc 70 engage in recesses of matching shape formed in the thickness of the external wall 62. Fixing screws are subsequently inserted into the holes 72 in the base 70 and into the holes opposite in the external wall 62. The first end 64 of the element 58 is thus fixed rigidly in all directions to the radially external wall 62 (FIG. 3).

According to the invention, the element 52 comprises at least one tubular cavity 63 extending along the measuring element 52 and in fluid communication with means of supply with pressurized fluid 74 allowing injection of a pressurized fluid into the cavity 63. The means of supply with pressurized fluid are controlled during operation by means of control 76 connected on entry to means of measurement 78 of the vibration frequency of the element, such as a dynamic strain gauge.

In a first practical embodiment of the invention, the element 80 has, in a plane perpendicular to its direction of elongation, a U shape formed of two branches 82a, 82b connected to each other by a junction section 83 of the branches 82a, 82b. A housing 86 is thus defined between the two branches 82a, 82b of the element 80 and the junction section 83. The junction section 83 has the nozzles 54 passing through it, which emerge in the housing 86 on one side and protrude outwards on the other side and are designed to measure the characteristics of an air flow. It will be noted that the U shape gives the element 80 and aerodynamic profile so as to limit the impact of the measuring element 80 on circulation of the air flow.

A first branch 82a comprises two tubular cavities 84a and a second branch 82b comprises two tubular cavities 84b. The two cavities 84a of the first branch 82a are connected to their radially internal ends. Likewise, the two cavities 84b of the second branch 82b are connected to their radially internal ends. The tubular cavities 84a, 84b are connected to the means of supply with pressurized air 74 with which they form a closed circuit. The tubular cavities 84a, 84b of the element form sealed cavities which are only in fluid communication with the means of supply with pressurized air.

Although the element comprises four tubular cavities 84a, 84b in the embodiment in FIGS. 4 and 5, it is understood that it could only comprises a single cavity in each branch 82a, 82b.

In this embodiment, the cables connected to the measuring nozzles extend in the direction of elongation of the element and are arranged in the housing 86 formed between the two branches 82a, 82b of the element 80. The radially internal end of the housing 86 could be closed by a wall.

According to the invention, varying the fluid pressure inside the cavities 84a, 84b of the branches 82a, 82b of the element 80 makes it possible to vary the stiffness of the element 80, which allows modification of the natural frequency of the element 80.

Indeed, it is clear that the fixing method of the measuring element 80, with the first external end 64 fixed rigidly in all directions and the second end 66 devoid of any fixing in the three axial, radial and circumferential directions, resembles a single-embedded beam model and that varying the stiffness by modifying the pressure allows modification of the natural frequency of the element 80 (refer to equation 1 above).

FIGS. 7 to 9 represent a second embodiment of the invention in which the element 88 comprises a cylindrical-section tubular body 90, the inside of which comprises a tubular cavity 91 in which cables 92 are engages for connection to nozzles for measuring the characteristics of a flow. These nozzles may for example be formed at the radially internal end of the element and be spaced apart from one another in the circumferential direction.

As illustrated in FIG. 7, a ring 96 is hermetically engaged, by means of annular seals 98, around a section 94 of the radially external part of the tubular body 90, wherein this section is arranged on the outside of the radially external wall 62. The ring 96 comprises a through orifice 100 aligned at its radially internal end with an orifice of the section 94 of the tubular body 90, the radially external end of which receives hermetically the downstream end of a duct 102 of the means of supply with pressurized fluid 74 (FIGS. 8 and 9). With such an assembly, the fluid circulating under pressure feeds the tubular cavity 94 for passage of the connection cables 92 to the measuring nozzles.

In the embodiments, the fluid is preferably air rather than a liquid, which offers the advantage of having a very low density that therefore has little influence on the mass of the element.

Application of pressure variation in the cavity or cavities of the element 80, 88 is performed by the means of control 76, which allow comparison of the vibration frequency $f_1$ with the resonance frequency of the element $fr_1$. In this respect, the means of control 76, connected to the means of measurement of the vibration frequency of the element, allow analysis and adaptation of the pressure in the cavity or cavities 84a, 84b, 91 as a function of the absolute value of the difference between a vibration frequency $f_1$ of said element 80, 88 and the resonance frequency $fr_1$ in order to check that the behaviour of the element 80, 88 is consistent with that which is expected.

Consequently, the method for varying the stiffness of the element comprises the steps involving:
a) identifying the pressure in said at least one tubular cavity of the measuring element 80, 88;
b) measuring the vibration frequency $f_1$ of said element 80, 88;
c) determining the natural frequency $fr_1$ of the measuring element based on the pressure identified in the cavity 84a, 84b, 91 and obtaining the absolute value $|f_1-fr_1|$;
d) comparing the absolute value $|f_1-fr_1|$ with a threshold and establishing a risk of resonance if this absolute value is less than or equal to the threshold in this case; and
e) if a risk of resonance has been established at the preceding step, varying the pressure in said at least one tubular cavity 84a, 84b, 91 of the measuring element 80,88 until the risk is no longer established.

Identification of the pressure in the tubular cavity may for example be performed in two different ways. The first may involve a direct measurement of the pressure in the cavity using a pressure sensor arranged in the cavity 84a, 84b, 91. The second may involve an indirect measurement estimated based on the pressure of the fluid sent into the closed circuit, which is determined based on the means of supplying with pressurized fluid. Naturally, the means of control must receive the pressure data in the cavity in order to be able to control the means of supply with pressurized fluid.

During operation, the element 80,88 will vibrate at a frequency $f_1$ following mainly the frequential excitation $f$ derived from rotation of the blades, without however excluding other sources of vibrations. When the frequencies $f_1$ and $fr_1$ are not sufficiently wide apart, two cases may arise:
$f_1 > fr_1$ corresponding to a situation in which the vibration frequency $f_1$ of the element 80,88 is greater than the natural frequency $fr_1$.
$f_1 < fr_1$ corresponding to a situation in which the vibration frequency $f_1$ of the element 80,88 is greater than the natural frequency $fr_1$.

In practice, the difference $|f_1-fr_1|$ should be at least equal to 10% of the value of $fr_1$ and in absolute terms should not be less than 5% of $fr_1$. The method of varying the stiffness of the element 80,88 makes it possible to safeguard the vibratory dynamics of the element by rendering the pressure in the element 80,88 dependent on the difference $|f_1-fr_1|$ and by maintaining the frequency $f_1$ at a maximum of 95% of $fr_1$ or a minimum of 105% of $fr_1$, hence excluding the interval [0.95 $fr_1$; 1.05 $fr_1$] and preferably the interval [0.9 $fr_1$; 1.1 $fr_1$].

Consequently, $fr_1$ needs to be moved apart from $f_1$ avoiding equality between these two values. This is achieved through a reduction in $fr_1$ when $f_1$ is higher and an increase in $fr_1$ when $f_1$ is lower.

Concretely, the reduction in $fr_1$ is obtained by reducing the pressure in the cavity or cavities 84a, 84b, 91 of the element 80, 88 and the increase in $fr_1$ is obtained by increasing the pressure in the cavity or cavities 84a, 84b, 91 of the element 80, 88.

The upwards or downwards variation in the natural frequency may be made possible by initial pressurizing of the cavities 84a, 84b, 91 of the element 80, 88 at a pressure greater than atmospheric pressure. The reduction in the pressure applied in relation to the initial pressure allows a reduction in the stiffness and therefore a decrease in the natural frequency of the element 80, 88. The reduction in the pressure applied in relation to the initial pressure applied allows an increase in the stiffness and therefore an increase in the natural frequency of the element 80, 88.

Such a method makes it possible to control the natural frequencies $fr_1$ of the element taking account of the excitation frequency $f_1$ induced by operation of the turbine engine.

The invention claimed is:

1. An apparatus, comprising:
an annular air flow passage including a radially internal annular wall and a radially external annular wall;
a source of pressurized fluid;
an elongated measuring element extending in a direction between the radially internal annular wall and the radially external annular wall, with an end of the measuring element fixed rigidly to the radially internal annular wall or the radially external annular wall, said measuring element comprises at least one tubular cavity extending along the measuring element and configured to receive pressurized fluid from the pressurized fluid source, the at least one tubular cavity being in a closed circuit with the source of the pressurized fluid.

2. The apparatus according to claim 1, wherein the measuring element has, in a plane perpendicular to its direction of elongation, a U shape formed of two branches and wherein, among said at least one tubular cavity, at least one cavity is arranged in each of the branches.

3. The apparatus according to claim 1, wherein the measuring element comprises a tubular body delimiting said at least one tubular cavity and includes nozzles, wherein the at least one tubular cavity extends along said direction of elongation and houses a plurality of cables connected to the nozzles for measuring the characteristics of the air flow in the flow passage, oriented in an upstream direction.

4. The apparatus according to claim 3, further comprising a ring, surrounding the tubular body, through which the at least one tubular cavity is supplied with pressurized fluid.

5. The apparatus according to claim 1, wherein the elongated measuring element extends in the annular flow passage in a primarily radial direction, wherein the end of the measuring element is fixed rigidly to the radially external annular wall, wherein the end of the measuring element is fixed to the radially external annular wall corresponds to a first end of the measuring element, and wherein a second end of the measuring element opposite said first end is free.

6. The apparatus according to claim 1, wherein the pressurized fluid is pressurized air.

7. A turbine engine comprising the apparatus according to claim 1 and an annular row of blades configured to be driven in rotation by a rotor, wherein said elongated measuring element is arranged in said flow passage downstream from said annular row of blades.

8. The apparatus according to claim 4, wherein the ring further includes annular seals.

9. Method for varying the stiffness of an elongated measuring element, in an annular flow passage having a radially internal annular wall and a radially external annular wall, the elongated measuring element extending in a direction between the radially internal annular wall and the radially external annular wall, with an end of the measuring element is fixed rigidly to the radially internal annular wall or the radially external annular wall, said measuring element comprising at least one tubular cavity extending along the measuring element and configured to receive pressurized fluid from a pressurized fluid source, the at least one tubular cavity being in a closed circuit with the source of the pressurized fluid;

the method comprising:
a) identifying the pressure in said at least one tubular cavity of the elongated measuring element;
b) measuring the vibration frequency $f_1$ of the elongated measuring element;
c) determining the natural frequency $f_{r1}$ of the elongated measuring element based on the pressure identified in the at least one tubular cavity and obtaining the absolute value $|f_1-f_{r1}|$;
d) comparing the absolute value $|f_1-f_{r1}|$ with a threshold and establishing a risk of resonance in response to determining that the absolute value is less than or equal to the threshold; and
e) in response to establishing the risk of resonance, varying the pressure in the at least one tubular cavity of the elongated measuring element until the risk is no longer present.

* * * * *